Figure 1:
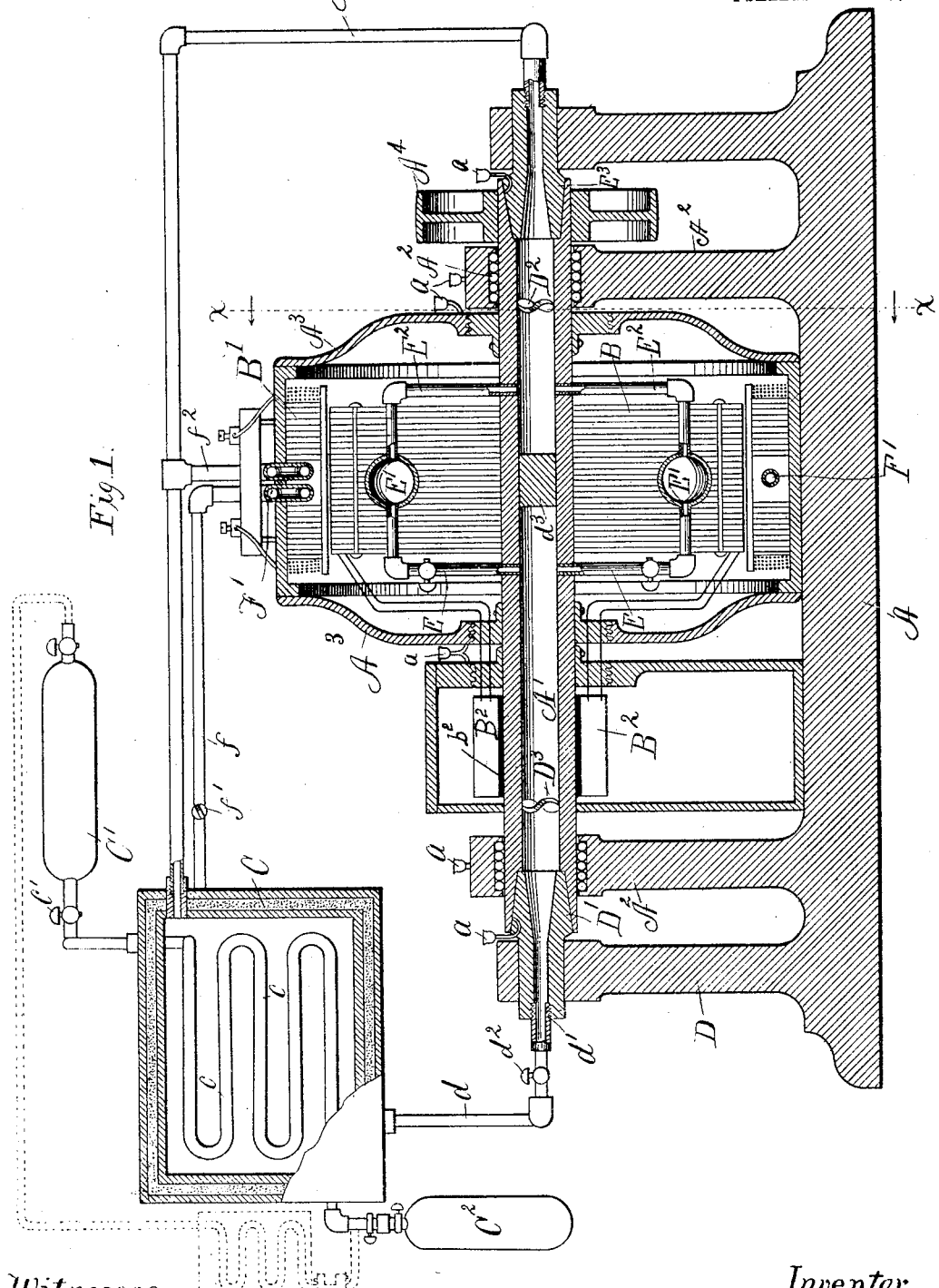

No. 798,156. PATENTED AUG. 29, 1905.
B. BIDWELL.
COOLING APPARATUS FOR ELECTRIC GENERATORS.
APPLICATION FILED NOV. 25, 1904.
4 SHEETS—SHEET 1.

Witnesses:
Chas. F. Bassett
Robt. Ths. Clegg

Inventor
Benson Bidwell
By Loren King
Attorney.

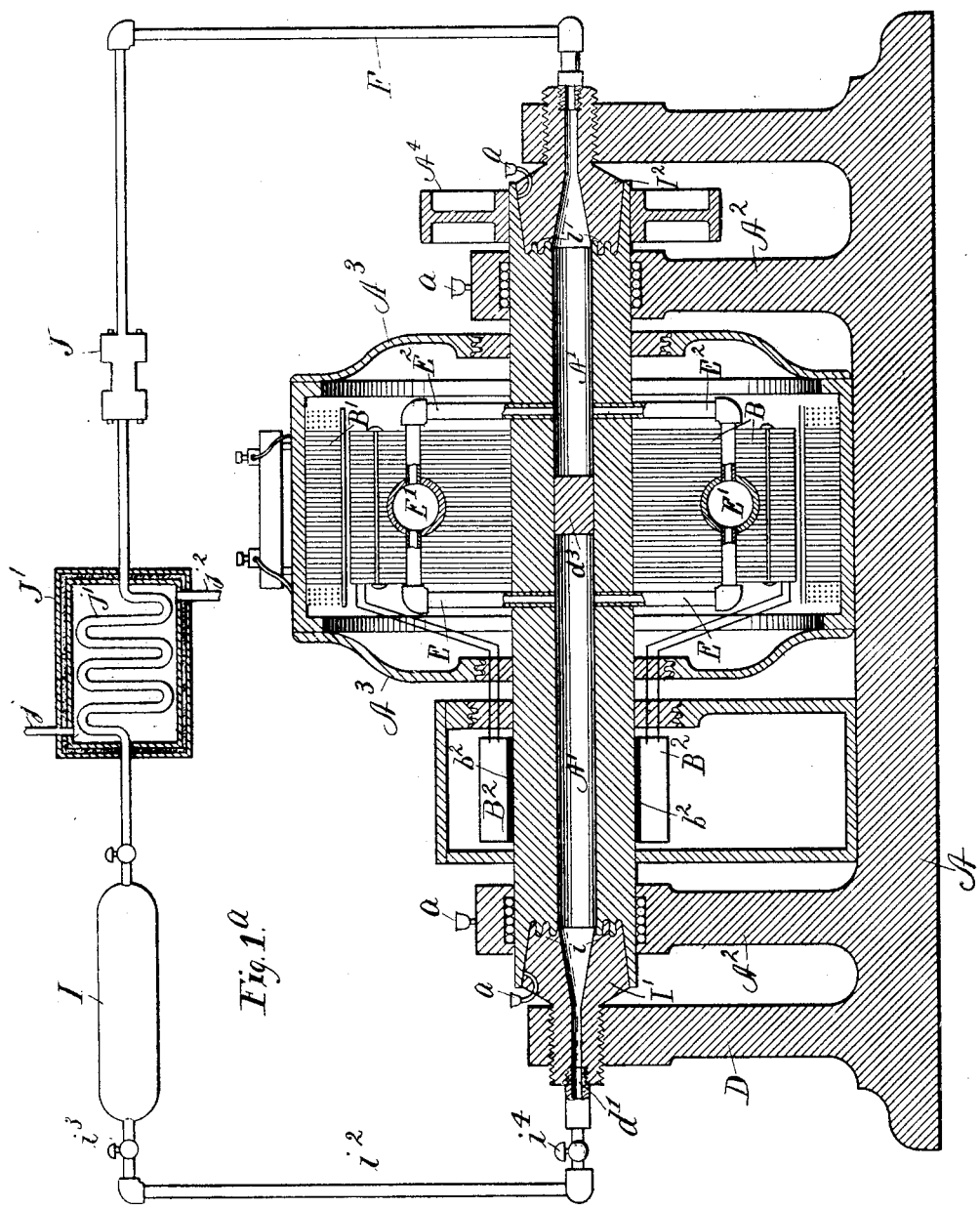

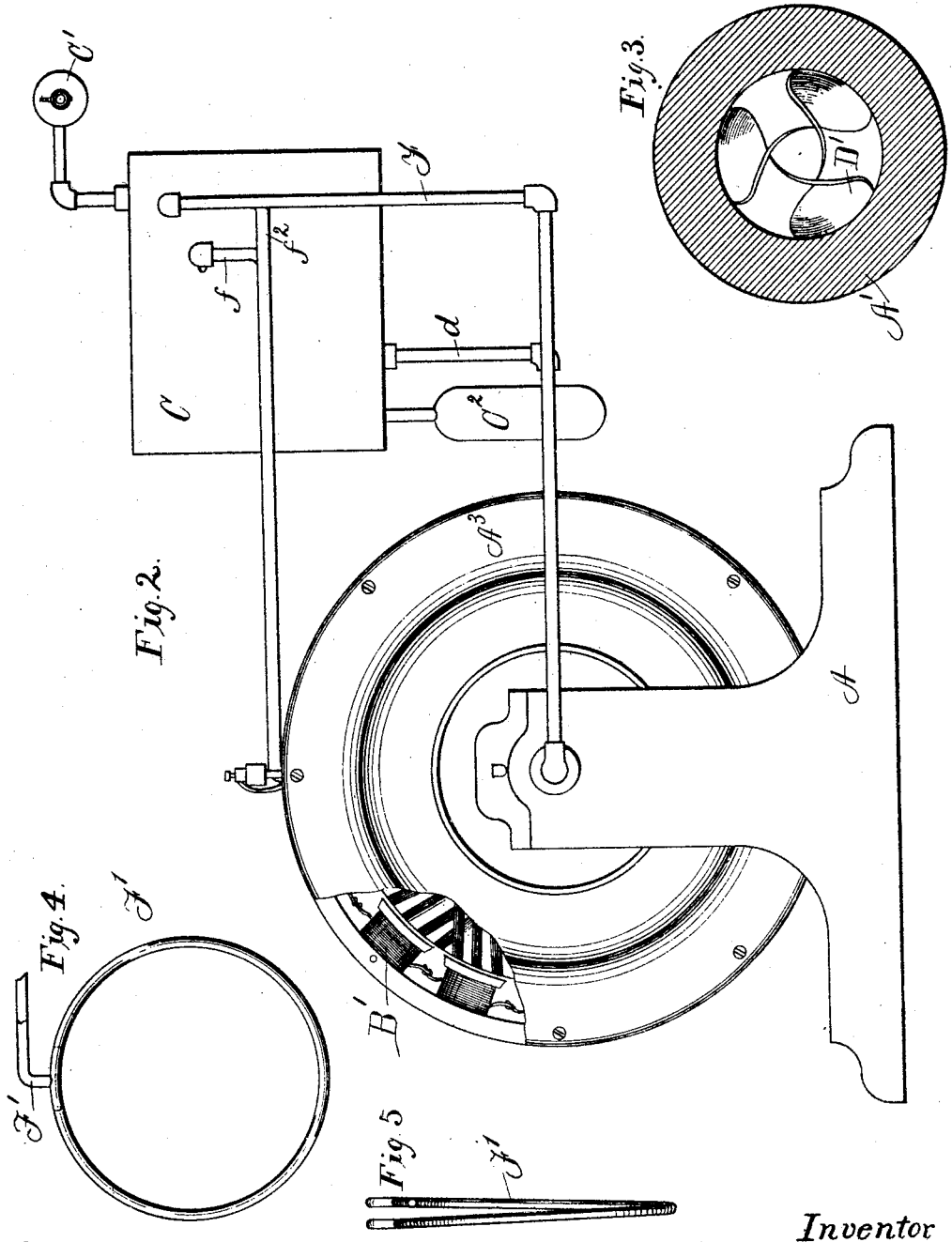

No. 798,156. PATENTED AUG. 29, 1905.
B. BIDWELL.
COOLING APPARATUS FOR ELECTRIC GENERATORS.
APPLICATION FILED NOV. 25, 1904.
4 SHEETS—SHEET 4.
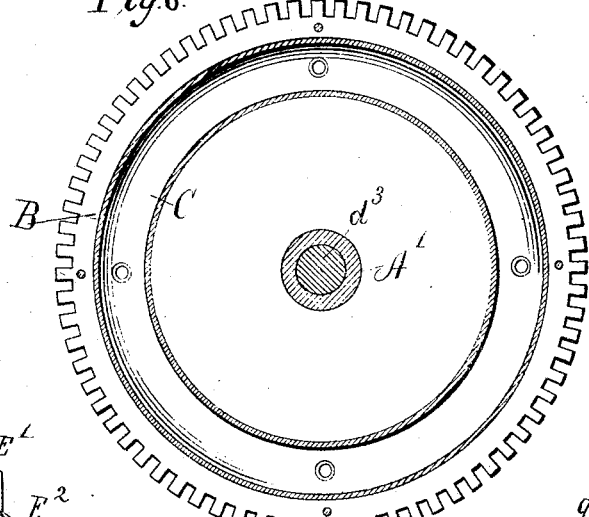
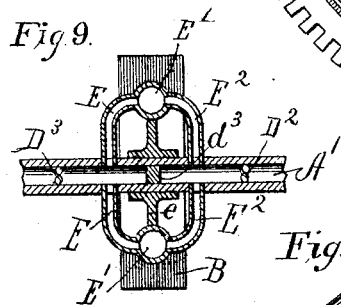
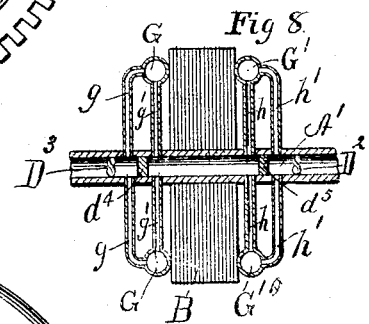
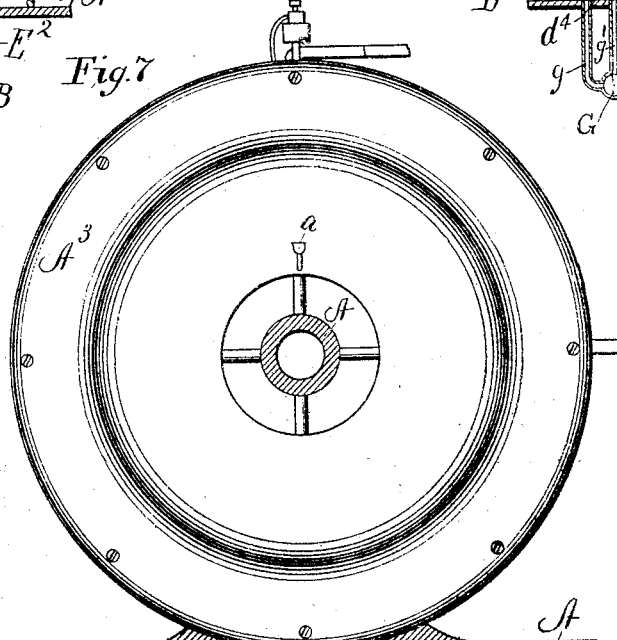
Witnesses:
Chas. F. Barrett
Robert F. Clegg
Inventor
Benson Bidwell
By ———— Attorney.

UNITED STATES PATENT OFFICE.

BENSON BIDWELL, OF CHICAGO, ILLINOIS, ASSIGNOR TO WILMER S. SNOW, OF CHICAGO, ILLINOIS.

COOLING APPARATUS FOR ELECTRIC GENERATORS.

No. 798,156.  Specification of Letters Patent.  Patented Aug. 29, 1905.

Application filed November 25, 1904. Serial No. 234,137.

*To all whom it may concern:*

Be it known that I, BENSON BIDWELL, a citizen of the United States, residing at Chicago, Illinois, have invented a certain new and useful Improvement in Cooling Apparatus for Generators, of which the following, taken in connection with the drawings, is a description.

My invention has special relation to cooling the field and armature coils and the cores of the same in dynamo-electric generators.

Heretofore difficulty has been experienced in operating machines of this kind to their full capacity, owing to the heat generated in the armature and field coils.

By means of my invention I am able to keep the armature cooled and to revolve it at a much higher rate of speed, thereby increasing the efficiency of the machine and correspondingly increasing the output of electricity. This result I accomplish by mounting the armature on a hollow shaft, from which is extended hollow tubes connecting with a cooling coil or cylinder which passes through the armature. A refrigerating apparatus is connected to the aforesaid hollow shaft, through which cooling fluid is passed and forced through the aforesaid tubes and cylinder, thence out through another tube and back to the cooling-tank. To this end my invention consists in the novel construction of parts hereinafter more particularly described and claimed.

I have illustrated my invention in preferred form in the accompanying drawings, in which—

Figure 1 is a longitudinal sectional view of one form of my apparatus. Fig. $1^a$ is a simplified form of construction. Fig. 2 is an end elevation of the same with part of the armature-casing broken away to show the field-coils. Fig. 3 is a cross-section of the armature-shaft with the turbine-wheel therein. Fig. 4 is a side elevation of the cooling-coil which passes through the field-magnets. Fig. 5 is an edge view of the coil shown in Fig. 4. Fig. 6 is a cross-section through a cooling-cylinder and a plan view of one of the armature-disks. Fig. 7 is a view taken on line $x\ x$ of Fig. 1 looking in the direction of the arrows. Figs. 8 and 9 represent modified forms of the arrangement of the cooling-coils.

In carrying out my invention (referring more particularly now to Fig. 1) A represents the base or support of the generating apparatus. A hollow shaft $A'$ is mounted in roller-bearings $A^2\ A^2$ extended from the base A.

$A^3$ represents the casings of the armature, which may be of the usual construction.

B represents the disks of the armature, mounted upon the hollow shaft $A'$, $B'$ the field-coils, and $B^2$ the commutator, and $b^2$ is the insulation between the commutator and shaft.

The casings, armature, field-coils, and commutator being of any well-known construction a detail description thereof will not here be given. A pulley $A^4$ is mounted upon shaft $A'$ and is revolved by any suitable source of power. (Not here shown.)

$a$ represents oil-cups of any well-known type. A cooling-tank C is disposed at any convenient location near the machine to be cooled. This tank contains the refrigerated brine which is used to cool the machine. The reservoir $C'$ contains anhydrous ammonia or any other refrigerating substance under pressure of approximately one hundred and seventy-five pounds. The cooling fluid or gas is allowed to pass to the coils $c$ in the brine-tank C, the flow being regulated by valve $c'$. As the cooling agent (if ammonia or compressed air) passes through the coils it absorbs the heat from the surrounding solution and passes through the compression-pump $c^2$ into condensing-coils $C^3$ and back into reservoir $C'$ to be used over again. If desired, the ammonia or cooling agent may be passed into the exhaust-cylinder $C^2$, which can be detached, the gaseous ammonia compressed and used over again. By means of this apparatus the brine for cooling the machine may be kept at any desired temperature.

Journaled in bearing D and fitting into the end of the hollow shaft $A'$ is a beveled swivel-joint $D'$. A pipe $d$ leads from the reservoir or cooling-tank C and is provided upon the end thereof with a screw-threaded connection $d'$, which fits into the end of the swivel-joint and through which the brine passes into the hollow shaft $A'$. The flow of brine is regulated by valve $d^2$.

A partition $d^3$ is disposed within the hollow shaft $A'$ at approximately the center of the armature. Turbine-wheels $D^2\ D^3$ are secured within the hollow shaft, one upon each side of the partition $d^3$.

Extending from the shaft $A'$ within the casing $A^3$ are the tubes E E, which extend through the disks B of the armature to the cooling-coil E'. As the brine enters the hollow shaft A' it is drawn therethrough by the turbine-wheel D². It is prevented from passing through the shaft by partition $d^3$ and is forced into pipes E E, and the centrifugal force of the revolving armature drives the brine through cooling-coil E' and out through pipes E² into the hollow shaft A' upon the opposite side of the partition $d^3$, when it is drawn out of the shaft by turbine-wheel D² and forced up through pipe F and back into the cooling-tank C to be used over again. A beveled swivel-joint E³, similar to the one previously described, is provided at the opposite end of the hollow shaft, through which the cooling fluid passes upon its return to the reservoir C.

The field-coils B' of the machine are cooled by the coil F', disposed in proximity thereto. The cooling fluid is taken from the tank C through pipe $f$, the flow thereof being regulated by valve $f'$. The fluid enters the cooling-coil through one end thereof, is circulated therethrough, and forced out at the opposite end through pipe $f^2$ into pipe F and back to the cooling-tank.

Referring now to the construction shown in Fig. 1ª, I have a modified or simplified form of my cooling apparatus, by means of which I am enabled to do away with some of the parts shown in Fig. 1. This construction is more particularly adapted for use where carbon dioxid, artificially-cooled air, or any other well-known liquid gas is used. The cooling fluid is stored under pressure in a tank or reservoir I. If gas is used as the cooling agent, the turbine-wheels may be dispensed with entirely. Beveled swivel-joints or union-joints I' I² are provided at each end of the hollow shaft. The joint and shaft are provided with interlocking grooves $i\ i'$, which make it when assembled air and gas tight. These interlocking grooves might be provided along the beveled edge of the shaft and joint, if desired; but I prefer the construction here shown. The gas is allowed to pass from the compression-tank I through pipe $i^2$, being controlled by valves $i^3$ and $i^4$, into the hollow shaft A', through branch tubes E into the circular cooling-coil E', out through tubes E² into shaft A'. Thence it passes through pipe F, through compression-pump J, into the condensing apparatus J', and back into compression-tank I, to be used over again. I have shown the pipe F connecting the hollow shaft with the condenser and compression-tank; but, as is obvious, this might be dispensed with if it were not desired to use the cooling-gas over again. When it is desired to use the gas over again, it is first passed through the pump J, where it is compressed to a high pressure, and enters the condensing-coils $j''$. A water-supply pipe $j$ conveys a stream of cold water upon the condensing-coils $j''$ in the condenser J'. The water from supply-pipe $j$ flows over the coils $j''$ and cools the gas therein, thus liquefying it. It then reënters the reservoir I and is ready to flow through the various operations again.

The construction of the cooling apparatus shown in Figs. 1 and 1ª is more desirable for use upon large machines. Where the armature to be cooled is a small one, the branch tubes E E² and circular cooling-coil E' might be dispensed with and the partition $d^3$ removed from shaft A', thus allowing the cooling fluid to pass directly through the hollow shaft A'.

In Figs. 8 and 9 I have shown an arrangement of my cooling-coils as applied either to a Gramme ring or a Siemens armature. It will be observed they are so disposed as not to require any change in the arrangement of the armature-disks.

The construction shown in Fig. 8 is more desirable for application to the Siemens armature. Two partitions $d^4$ and $d^5$ are secured within the hollow shaft A' with the turbine-wheels D³ D². The cooling fluid passes from the hollow shaft A' through pipes $g$ into the cooling-coil G, which is disposed upon one side of the armature in proximity to the disks B. From the coil it is passed through pipes $g'$ into the hollow shaft A'. It is then passed through pipes $h$ to the cooling-coil G' upon the opposite side of the armature-disks and in proximity thereto. From this cooling-coil it is forced into pipes $h'$ back into the hollow shaft A' and returned to the cooling-tank, as previously described.

Fig. 9 represents my cooling apparatus as applied to a Gramme-ring armature. The partition $d^3$ and the turbines D² and D³ are disposed within the hollow shaft A', as in Fig. 1. A circular cooling-coil E' is arranged inside of the armature-disks B and supported in position by the spider $e$. Branch tubes E extend from the hollow shaft to the cooling-coil upon one side of the partition, and tubes E² extend from said cooling-coil E' back to the hollow shaft. The operation is the same as that described in Fig. 1.

It is obvious that various arrangements other than those I have shown might be made to secure the desired effect of the cooling-coils upon the armature of a dynamo without departing from the spirit of my invention, which consists, essentially, in arranging coils containing a cooling agent in such proximity to the heat-generating surfaces of a dynamo or motor as to produce an assimilative effect thereon, thereby enabling the machine to be revolved at a much higher rate of speed and proportionally increasing its output.

I have shown and described turbine-wheels within the hollow shaft; but a water-wheel or Archimedean screw or any other propeller would answer the same purpose as well, and by my invention I contemplate such use.

I do not desire to be limited to the use of anhydrous ammonia, carbon dioxid, or the cooling liquids herein mentioned to be used in this apparatus, as I contemplate the use of any well-known refrigerating medium.

I claim—

1. In a dynamo-electric machine, a hollow partitioned shaft, a circular tube or cooling-cylinder in proximity to the core of the armature of said machine, branch pipes connecting said cooling-cylinder with the aforesaid hollow shaft, and means for forcing a cooling fluid through said shaft and tubes, substantially as described.

2. In a dynamo-electric machine, a hollow partitioned shaft having an armature mounted thereon, tubes connecting said shaft with a cooling-reservoir, a turbine-wheel disposed near the entrance of said shaft for drawing the cooling fluid therein, branch tubes leading from said hollow shaft, said tubes disposed in proximity to the armature-disks, means for forcing the cooling fluid through said branch tubes and back into the hollow shaft, and means for returning it to the cooling-reservoir, substantially as described.

3. In a dynamo-electric machine, a hollow partitioned shaft, propeller-wheels secured in said shaft upon either side of the partition, substantially as described.

4. In a dynamo-electric machine, a hollow partitioned shaft, propeller-wheels secured in said shaft upon either side of the partition, an armature mounted on said shaft, a cooling-cylinder disposed in proximity to the disks of said armature, and branch tubes forming communication between said cooling-cylinder and shaft, substantially as described.

5. In a dynamo-electric machine a hollow partitioned shaft, one end of said shaft connected with the cooling-chamber of a refrigerating apparatus, an armature mounted upon the aforesaid hollow shaft, cooling-cylinders disposed in close proximity to the disks of said armature, branch tubes connecting said cooling-cylinders with the hollow shaft, means for drawing the cooling fluid into said shaft at one end, and means for discharging it into a return-pipe at the opposite end, substantially as described.

6. In a dynamo-electric machine, a hollow partitioned shaft, having beveled swivel-joints at either end thereof, propellers secured in said shaft, and means for connecting said shaft with the cooling-chamber of a refrigerating apparatus, substantially as described.

7. In a dynamo-electric machine, an armature mounted upon a hollow partitioned shaft, a cooling-cylinder mounted in proximity to the periphery of said armature, branch tubes connecting said cylinder with the hollow shaft, and means for connecting said shaft with the cooling-chamber of a refrigerating apparatus, substantially as described.

8. In a dynamo-electric machine, an armature mounted upon a hollow partitioned shaft, said shaft connected with the cooling-chamber of a refrigerating apparatus, cooling-coils disposed in proximity to the disks of said armature and having communication with said hollow shaft, means for forcing a cooling fluid into said cooling-coils, and means for withdrawing it therefrom, substantially as described.

9. In a device of the class described the combination of a dynamo-electric machine with a refrigerating apparatus comprising a cooling-tank, cooling-coils passing through said tank, and an ammonia-cylinder having connection with said cooling-coils, substantially as described.

10. In a device of the class described, the combination of a dynamo-electric machine with a refrigerating apparatus comprising a cooling-tank, cooling-coils passing through said tank, and a cylinder having connection with said cooling-coils, substantially as described.

11. In a device of the class described the combination of a dynamo-electric machine with a refrigerating apparatus comprising a cooling-tank, cooling-coils passing through said tank, a cylinder containing a refrigerating fluid adapted to pass through said coils, and a compression and condensing apparatus adapted to condense and return the refrigerating fluid to the cylinder after it has passed through the cooling-coils, substantially as described.

12. In a device of the class described the combination of a dynamo-electric machine, a hollow partitioned shaft upon which the armature of said machine is mounted, stationary propeller-wheels disposed within said shaft, beveled swivel-joints at one or both ends of said shaft, pipes or tubes connecting said shaft with a reservoir containing a cooling-gas, substantially as described.

13. In a device of the class described, the combination of a dynamo-electric machine, a hollow partitioned shaft upon which the armature of said machine is mounted, grooved abutments formed upon the inside of said hollow shaft a short distance from the ends thereof, said shaft being beveled from said abutment to the end thereof, a beveled swivel-joint having grooves upon the inner end thereof which are adapted to interlock with the aforesaid grooved abutments to form an air and gas tight-joint, substantially as described.

14. In a device of the class described the combination of a dynamo-electric machine with a hollow partitioned shaft upon which the armature of said machine is mounted, cooling-coils disposed in proximity to said armature, a grooved abutment near the end of said shaft, a beveled swivel-joint having grooves upon the inner end thereof adapted to interlock with the grooves in said abutment, said joint having connection with a reservoir containing a cooling-gas which is
5 adapted to pass through the aforesaid shaft and cooling-coils, substantially as described.

In testimony whereof I have signed this specification in the presence of two subscribing witnesses.

BENSON BIDWELL.

Witnesses:
 ROBERT THOMAS CLEGG,
 CHARLES I. COBB.